United States Patent
Lovell et al.

(10) Patent No.: US 7,418,353 B2
(45) Date of Patent: Aug. 26, 2008

(54) DETERMINING FILM STRESS FROM SUBSTRATE SHAPE USING FINITE ELEMENT PROCEDURES

(75) Inventors: Edward G. Lovell, Madison, WI (US); Zhaohua Feng, Changchun (CN); Roxann L. Engelstad, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 11/245,938

(22) Filed: Oct. 7, 2005

(65) Prior Publication Data
US 2006/0123919 A1    Jun. 15, 2006

Related U.S. Application Data

(60) Provisional application No. 60/617,970, filed on Oct. 12, 2004.

(51) Int. Cl.
*G01L 1/00* (2006.01)
*G01D 7/02* (2006.01)

(52) U.S. Cl. .......................................... 702/42; 73/789
(58) Field of Classification Search ................... 73/800, 73/788, 150 A, 762; 356/32, 301; 702/42
See application file for complete search history.

(56) References Cited

U.S. PATENT DOCUMENTS

| | | | |
|---|---|---|---|
| 4,812,036 A | 3/1989 | Inoue | |
| 5,438,879 A | 8/1995 | Reda | |
| 5,546,811 A | 8/1996 | Rogers et al. | |
| 5,847,283 A | 12/1998 | Finot et al. | |
| 6,031,611 A | 2/2000 | Rosakis et al. | |
| 6,050,138 A | 4/2000 | Lynch et al. | |
| 6,513,389 B2 | 2/2003 | Suresh et al. | |
| 6,600,565 B1 | 7/2003 | Suresh et al. | |
| 2002/0012122 A1 | 1/2002 | Boyd et al. | |
| 2002/0066310 A1 | 6/2002 | Jachim | |

OTHER PUBLICATIONS

Feng et al., "Film Stress Characterization Using Substrate Shape Data and Numerical Techniques", Mat. Res. Soc. Symp. Proc. vol. 750 pp. Y3.4.1-6. Fall 2002. Accessed Mar. 16, 2007. [online] http://lucy.mrs.org/cgi-bin/check_membership_access/proceedings/fall2002/y/Y3_4.pdf.*

(Continued)

*Primary Examiner*—Edward Lefkowitz
*Assistant Examiner*—Jonathan Dunlap
(74) *Attorney, Agent, or Firm*—DeWitt Ross & Stevens S.C.

(57) ABSTRACT

A method for determining the stresses in a film applied to a substrate from measured substrate shape. The substrate is first analyzed using finite element techniques to obtain nodal forces at the surface of the substrate to which the film is applied, based on measured distortion data of the substrate surface. The film is then analyzed to calculate the film stresses from the applied nodal forces using finite element techniques. The invention may be applied to determine stresses in thin films applied to a variety of substrates, including those used for micro-electronic (e.g., integrated circuit) and micro-mechanical devices and/or for the lithography masks or other optical/projection systems used to fabricate such devices.

19 Claims, 3 Drawing Sheets

OTHER PUBLICATIONS

Engelstad et al., "Evaluation of intrinsic film stress distributions from induced substrate deformation", Microelectronic Engineering, vols. 78-79, Proceedings of the 30th International Conference on Micro- and Nano-Engineering, Mar. 2005, pp. 404-409. (http://www.sciencedirect.com/science/article/B6V0W-4F9F5SF-7/2/cc63e26c64a5b40f7838.*

Blech et al., "Determination of thin-film stresses on round substrates", Journal of Applied Physics. vol. 97. Accessed Mar. 21, 2007. Published Jun. 1, 2005.*

Elsevier Science S.A., N.G. Shang et al., Intrinsic stress evolution in diamond films prepared in a $CH_4$-$H_2$-$NH_3$ hot filament chemical vapor deposition system, Diamond and Related Materials 9, pp. 1388-1392, 2000.

American Institute of Physics, Mauro J. Kobrinsky et al., Diffusional creep in damascene Cu lines, Journal of Applied Physics, vol. 89, No. 1, pp. 91-98, Jan. 1, 2001.

American Vacuum Society, N.N. Iosad et al., Reactive magnetron sputter deposition of NbN and (Nb, It)N films related to sputtering source characterization and optimization, J. Vac. Sci. Technol. A 19(4), pp. 1840-1845, Jul./Aug. 2001.

R. P. Singh & A. J. Rosakis. Determination of the Yield Properties of Thin Films Using Enhanced Coherent Gradient Sensing, Experimental Mechanics, vol. 41, No. 4, pp. 403-411, Dec. 2001.

The Electrochemical Society, Inc., Sang Yeol Kang, et al., Metallorganic Chemical Vapor Deposition of Ru Films Using Cyclopentadienyl-Propylcyclopentadienylruthenium (II) and Oxygen, Journal of The Electrochemical Society, 149 (6) C317-C323, 2002.

American Institute of Physics, A. B. Mann, et al., Apparatus to measure wafer curvature for multilayer systems in a vacuum furnace, Review of Scientific Instruments, vol. 73, No. 4, pp. 1821-1827, Apr. 2002.

American Institute of Physics, Han-Su Kim et al., Effective method for stress reduction in thick porous silicon films, Applied Physics Letters, vol. 80, No. 13, pp. 2287-2289, Apr. 1, 2002.

Veeco Instruments, Inc., Mike Zecchino & Tim Cunningham, Thin Film Stress Measurement Using Dektak Stylus Profilers, 2004, Tucson, Arizona.

Bekaert Advanced Coating Technologies, Testing & Analysis, Stress Measurement, printed from http://www.bactusa.com/index.cfm?page=4f on Nov. 11, 2004, Amherst, New York.

* cited by examiner

DETERMINING FILM STRESS FROM SUBSTRATE SHAPE USING FINITE ELEMENT PROCEDURES

This application claims the benefit of U.S. Provisional Patent Application No. 60/617,970, filed on Oct. 12, 2004.

This invention was made with United States government support awarded by the following agencies: DOD ARPA DAAD17-99-C-0085. The United States has certain rights in this invention.

FIELD OF THE INVENTION

This invention pertains generally to systems and methods for analyzing the stress in thin films applied to substrates and, more particularly, to such systems and methods as may be used to analyze thin films as applied to substrates as used in integrated circuit and similar micro-electronic and micro-mechanical device fabrication.

BACKGROUND OF THE INVENTION

In the fabrication of integrated circuits, and other semiconductor devices, a substrate wafer, made of a material such as single crystal silicon, is doped, and a thin film is applied on the substrate surface. Thin films of conductive or insulative material may be deposited or otherwise applied onto the surface of the substrate, typically to a thickness of less than one micrometer, by a variety of conventional processes. The applied films are patterned to define an integrated circuit or other structure, with conductive films patterned to form device gates or interconnects and insulating films patterned to provide electrical isolation.

Thin films applied to substrates, in semiconductor manufacturing or otherwise, typically exhibit some intrinsic stress. This stress may be caused by a variety of mechanisms, such as lattice mismatch and dissimilar thermal expansion coefficients of the film and the substrate wafer. Failure to control these stresses can lead to failure of the electronic devices formed on the substrate. Device failure due to film stress may be caused, for example, by dislocation generation, film cracking, delamination, and/or void formation. Film stress may be controlled, to some extent, during application of the film onto the substrate by process variation, or afterward by annealing. However, in order accurately to control film stress, the stress must be measured accurately.

The patterning of the thin film that is applied to the substrate surface of the semiconductor device to form, e.g., an integrated circuit, typically is accomplished using a lithographic process employing one or more lithography masks. These lithography masks themselves typically are formed as a thin film layer, or multiple thin film layers, applied to a substrate. The thin film applied to the mask substrate is patterned, e.g., using laser etching, to form the mask pattern which, during the lithography process, is transferred to the integrated circuit substrate wafer being formed.

Feature sizes in modern integrated circuits have decreased dramatically in recent years. In order to meet the stringent requirements of reduced feature size, next-generation lithography (NGL) techniques, such as extreme ultraviolet lithography (EUVL) and electron projection lithography (EPL), are being developed. Design and implementation of a low-distortion lithography mask is one of the key issues for all NGL technologies. Intrinsic film stress generated during the fabrication process of advanced NGL masks can cause significant mechanical distortions, which compromise the accuracy of image resolution and placement. Dependable stress measurements thus also are necessary for controlling the distortions in the lithography masks used in semiconductor device fabrication to achieve high-quality reduced-feature size integrated circuits.

Techniques for directly measuring localized thin-film strain have been used for many years. Such techniques include x-ray diffraction and micro-Raman spectroscopy. However, the equipment required to obtain such direct measurements is expensive, and such methods are not well suited for production environments.

A common indirect method for determining thin film stress as used in the semiconductor industry is based on the measurement of the curvature of the substrate wafer, with a thin film applied thereto, to determine the thin film stress. This indirect method employs a laser scanner or full-field measurement device to determine the curvature of the substrate wafer. The out-of-plane displacement (OPD), rotation of the cross section, or the curvature generated by the intrinsic stress are measured in this manner. The film stress is then computed from the measured data. Although most available measuring tools provide accurate information about the induced substrate shape, i.e., the distorted shape of the substrate wafer with film applied, the film stress magnitudes and distributions generated by such techniques, in general, are not reliable. This is due to the fact that the calculations are based upon the local application of Stoney's equation, which is not valid for most real film-substrate systems.

The film and substrate comprising a semiconductor device, or mask used in the fabrication thereof, are usually made from different materials and have different lattice structure and thermal parameters. Thus, when the film is deposited onto the substrate, lattice and thermal mismatch strains are generated. These strains cause intrinsic stress and deformation in the film-substrate system. The film stress and substrate deformation are interdependent, so film stress can be determined from the measured substrate deformation. Stoney's equation is the most well-known expression linking film stress to substrate curvature. It was originally derived for a beam flexed by a uniform stressed film, and can be extended to determine the film stress on a plate substrate:

$$\sigma_f = E_s t^2_s K / 6 t_f (1 - \nu_s) \qquad (1)$$

where, $\sigma_f$=film normal stress;
$E_s$=elastic modulus of substrate;
$t_s$=substrate thickness;
$t_f$=film thickness;
$\nu_s$=Poisson's ratio of the substrate;
K=curvature caused by intrinsic stress.

Equation (1) is based on the assumption that the two in-plane principal stresses are equal to each other and their distribution is uniform. This assumption can be equivalently stated that, over the substrate, the curvature K is constant. In other words, the deformed substrate surface is perfectly spherical. Currently, many metrology tool manufacturers utilize Eq. (1) to calculate film stress point-by-point, i.e., the constant curvature K is replaced by the local curvature, $K_{loc}$. However, the validity of locally applying Stoney's equation has not been established. In most cases, the deformed substrate shape is not perfectly spherical, so the applicability of Stoney's equation is significantly limited.

Traditional finite element methods are widely used to analyze structures with known loads, and have also been applied to compute the film stress in film-substrate systems when the thermal and lattice mismatch strains were determined or estimated. However, in semiconductor and similar device manufacturing cases, the loading, intrinsic stress, or mismatch strain (which causes the film and substrate deformation) is unknown. Only the out-of-plane displacements, cross-section rotations, or curvatures at discrete points on top of the film or bottom of the substrate can be measured and can be used as input data for a finite element analysis.

What is desired, therefore, is an improved method for determining the film stress in thin films applied to substrates, particularly thin films applied to semiconductor substrates or thin films applied to substrates to form lithography masks used in semiconductor and similar fabrication processes. The desired method for determining film stress preferably is an indirect method that does not require expensive equipment, that is well-suited for production environments, and that is more accurate than current indirect methods for determining film stress that employ Stoney's equation.

SUMMARY OF THE INVENTION

The present invention provides a system and method for determining the stresses in thin films applied to substrates using measured substrate shape data and numerical computation techniques. The present invention may be applied to determine the stress at any thin film applied to a substrate, but is particularly applicable to determining the stresses oh thin films applied to substrates such as semiconductor wafers and lithographic reticles, such as for lithography masks used in the fabrication of micro-electronic or micro-mechanical devices. The present invention uses experimentally measured substrate shape data to determine all characteristics of the thin film stress field using a novel computational scheme involving finite element analysis. A technique for determining film stresses from substrate shape in accordance with the present invention can be divided into two principal steps. First, the deformed substrate is analyzed alone to identify the finite element nodal forces on the substrate-film interface surface which cause the measured shape. Next, the film is analyzed separately using these nodal forces as known loads to determine the stresses they produce in the thin film.

The present invention may be implemented using one or more computer programs running on a conventional computer system. A conventional measuring device for measuring the shape, e.g., the displacement, cross-section rotation, and/or curvature, of the substrate to which a thin film is applied may be used to obtain substrate displacement/shape data that is provided to the computer system. Based on this substrate deformation data, stress in the thin film applied to the substrate may be determined accurately in accordance with the present invention without any further measurements. The substrate shape may be measured and film stress determined in accordance with the present invention either after the film has been applied to the substrate or during the process of applying the film to the substrate. In the latter case, the determined film stress may be used to dynamically adjust the film application process to reduce film stress in the applied film, e.g., by providing the determined film stress data to an appropriate process controller.

The determination of film stress in accordance with the present invention begins by considering the film and the substrate to which the film is applied separately. The substrate is divided into plate elements and the film into plane stress elements. (For example, the substrate is meshed by quadrilateral plate elements and the film is meshed by quadrilateral plane elements. Other types of elements may also be used, e.g., three-dimensional solid elements for the substrate and shell elements for the film.) All nodes for the substrate plate elements and film plane stress elements are set at the interface between the substrate and the film.

First the substrate is analyzed. At each defined node of the substrate there are six degrees of freedom, i.e., three displacements and three rotations. Any of the following data types can be measured at a number of points on the substrate surface using a conventional measurement system: out-of-plane displacement (OPD), cross-section rotation, and/or curvature. From the measured values the substrate OPD, IPD (in-plane displacement) and cross-section rotations at all of the defined substrate nodes are computed by interpolation, using the basic equations of analytical geometry and plate theory. The nodal forces on the substrate top are then calculated by a matrix multiplication of the substrate displacement matrix and a stiffness matrix of the substrate.

From the matrix defining the nodal forces on the substrate top, the forces acting on the film are defined as the negative or opposite of the nodal forces acting on the substrate top. A film displacement matrix is then found by solving an equation including the matrix defining the nodal forces acting on the film and a film stiffness matrix. The film stresses are then calculated element by element using the resulting film displacement matrix elements. All of the computations required to calculate the film stress in this manner in accordance with the present invention may be performed using either specialized software or conventional commercial finite element analysis software products.

The assumption that the film stress is uniform, or the deformed substrate shape is spherical, is fundamental for applying Stoney's equation, but it is unnecessary for performing a finite element analysis in accordance with the present invention. Thus, the present invention can be used to accurately determine film stress for a film-substrate system in which the curvature, mismatch strain, and film stress are functions of location and direction.

Further objects, features, and advantages of the present invention will be apparent from the following detailed description taken in conjunction with the accompanying drawings.

DETAILED DESCRIPTION OF THE INVENTION

The present invention now will be described in detail. First, a generic system and method for determining film stress from substrate shape using finite element procedures in accordance with the present invention will be described in detail. An exemplary application of a method for determining film stress from substrate shape using finite element procedures in accordance with the present invention will then be presented in detail. Finally, an exemplary analysis showing the improved accuracy provided by a method for determining film stress from substrate shape using finite element procedures in accordance with the present invention over existing methods for determining film stress using Stoney's equation will be presented. Based on the detailed written description, drawings, and examples provided herein any person skilled in the art to which this invention pertains will be able to implement a method for determining film stress from substrate shape using finite element procedures in accordance with the present invention using conventional hardware and software programming procedures.

The present invention will be described in detail herein with specific reference to the exemplary application thereof to determining the film stresses in thin films applied to substrates as used in semiconductor device fabrication, e.g., for determining the stresses in thin films applied to substrates from which micro-electronic (e.g., integrated circuits) or micro-mechanical devices are formed or from which the lithography masks or other optical reticles used in the fabrication of such micro-electronic or micro-mechanical devices are formed. It should be understood, however, that the present invention may be applied to determining the film stress in other cases wherein a thin film is applied to a relatively thicker substrate and in which accurate determination of the stresses in the film are required or desired.

When the mismatch strain in a substrate-film system is high, and the substrate is ultra-thin, the out-of-plane displacement generated by the mismatch strain may be larger than the substrate thickness and the relationship between the strain and the induced curvature becomes geometrically nonlinear. The allowable out-of-plane displacement for a lithography mask, for example, is very small, and usually within the linear range. It should be noted, however, that a method for determining film stress in accordance with the present invention can be used in both linear and nonlinear situations.

Figure 1:
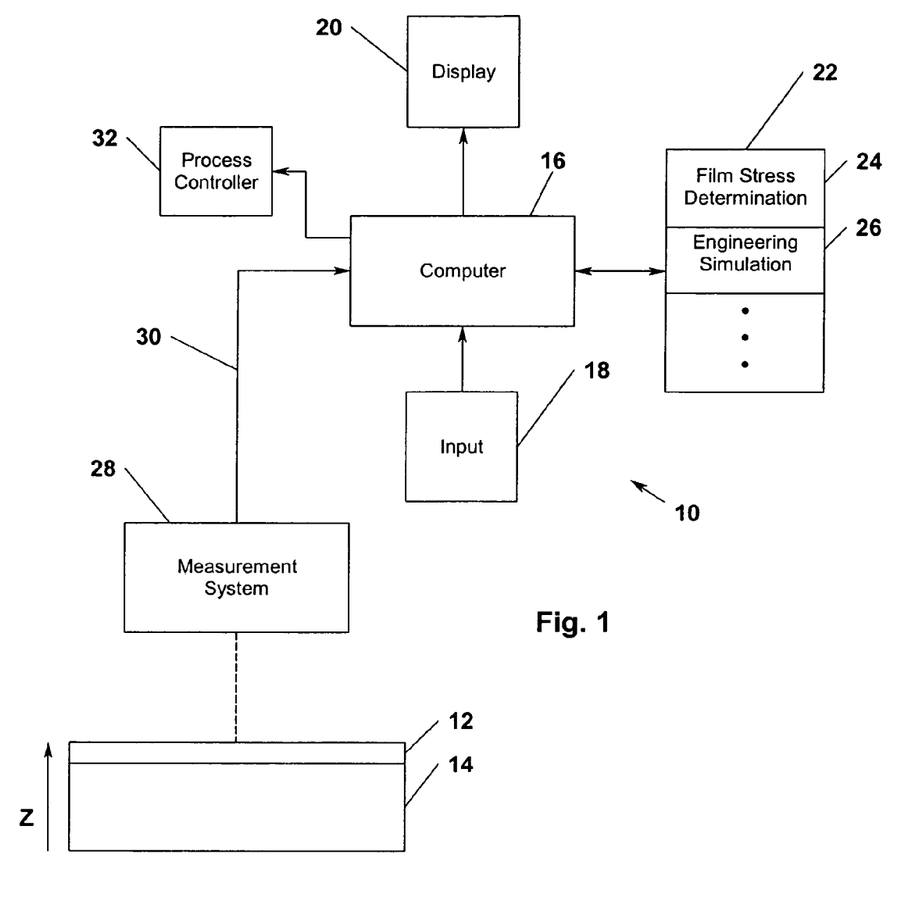
FIG. 1 is a schematic block diagram of an exemplary system for determining film stress from substrate shape using finite element procedures in accordance with the present invention.

An exemplary system 10 for determining film stress from substrate shape using finite element procedures in accordance with the present invention is illustrated in, and will be described with reference to, FIG. 1. As discussed above, the present invention may be used accurately to determine the stresses in a thin film 12 applied to a relatively thicker substrate 14. For example, in the context of micro-electronic or micro-mechanical device fabrication, the thin film 12 may be a conductive material, such as aluminum, tungsten, or polysilicon, or an insulating material, such as silicon nitride or silicon dioxide, that is deposited on the surface of the substrate 14 by sputtering or evaporation, or may be grown on the surface of the substrate 14 by placing the substrate 14 in a reactive environment. In this context, the substrate 14 typically is a wafer of single crystal silicon. The thin film 12 deposited on the surface of the substrate 14 may be processed either to form a micro-electronic (e.g., integrated circuit) or micro-mechanical device structure, or a lithography mask or similar structure used in the fabrication of such micro-electronic or micro-mechanical devices. In any case, as discussed above, accurate determination of the stresses in the thin film 12 applied to the substrate 14 is necessary, in that such stresses distort the thin film 12, thereby resulting in damage and/or distortion to the structure subsequently formed by the thin film 12. Only by accurately determining the film stresses can these distortions be controlled to achieve, as an end result, high-quality integrated circuits or similar devices.

A method for determining film stress from substrate shape using finite element procedures in accordance with the present invention may be implemented with software in a conventional computer system 16. Conventional input devices 18, e.g., a keyboard, mouse, track ball, etc., and display or output devices 20, e.g., a conventional computer display and printer, may be provided to allow an operator of the system 10 to interact with the programs for determining film stress in accordance with the present invention as implemented on the computer system 16 as well as to review the results of the film stress determination. The computer system 16 may be provided with conventional memory 22 in which the computer programs 24 for determining film stress from substrate shape using finite element procedures in accordance with the present invention are stored. These computer programs may include specialized or conventional commercially available engineering simulation programs 26, such as the ANSYS® engineering simulation software available from ANSYS, Inc. of Canonsburg, Pa., as well as custom software in accordance with the present invention for determining film stress from substrate shape using the finite element procedures as provided by the engineering simulation software 26. Additional general computer programs required for operation of the computer system 16, e.g., conventional operating system software, as well as storage for data used to determine film stress as well as the results of such determination also may be provided in memory 22. Note that memory 22 may be implemented as one or more memory devices including RAM, ROM, disc storage, and the like.

In accordance with the present invention, film stress is determined from substrate shape. Substrate shape data may be obtained and provided to the computer system 16 using a conventional measuring system 28. One or more conventional measurement systems 28 may be employed, for example, to determine the out-of-plane displacement (OPD), cross-section rotation, and/or curvature of the substrate 14 at a number of points on the substrate. The measurement techniques employed may include interferometry, profilometry, laser scanning, etc. The measurement information obtained by the measurement system 28 may be provided directly to the computer system 16 in which the method for determining film stress in accordance with the present invention is implemented, e.g., by a direct wired, wireless, and/or network connection 30. Alternatively, substrate shape information obtained by the measurement system 28 may be stored on a movable computer disk or other storage media and physically transferred to the computer system 16 for loading thereon.

The measurement system 28 may be adapted to measure substrate shape during the process of applying the thin film 12 to the substrate 14, and to provide such measurement information to the computer 16 during the film forming process. In such case, the film stress in the film 12 being applied may be determined in accordance with the present invention as the film 12 is being applied to the substrate 14. By determining film stress in situ in this manner, dynamic feedback may be provided to adjust the film forming process to reduce film stress on the applied film 12, e.g., by providing the film stress data as feedback to a process controller 32.

Figure 2:
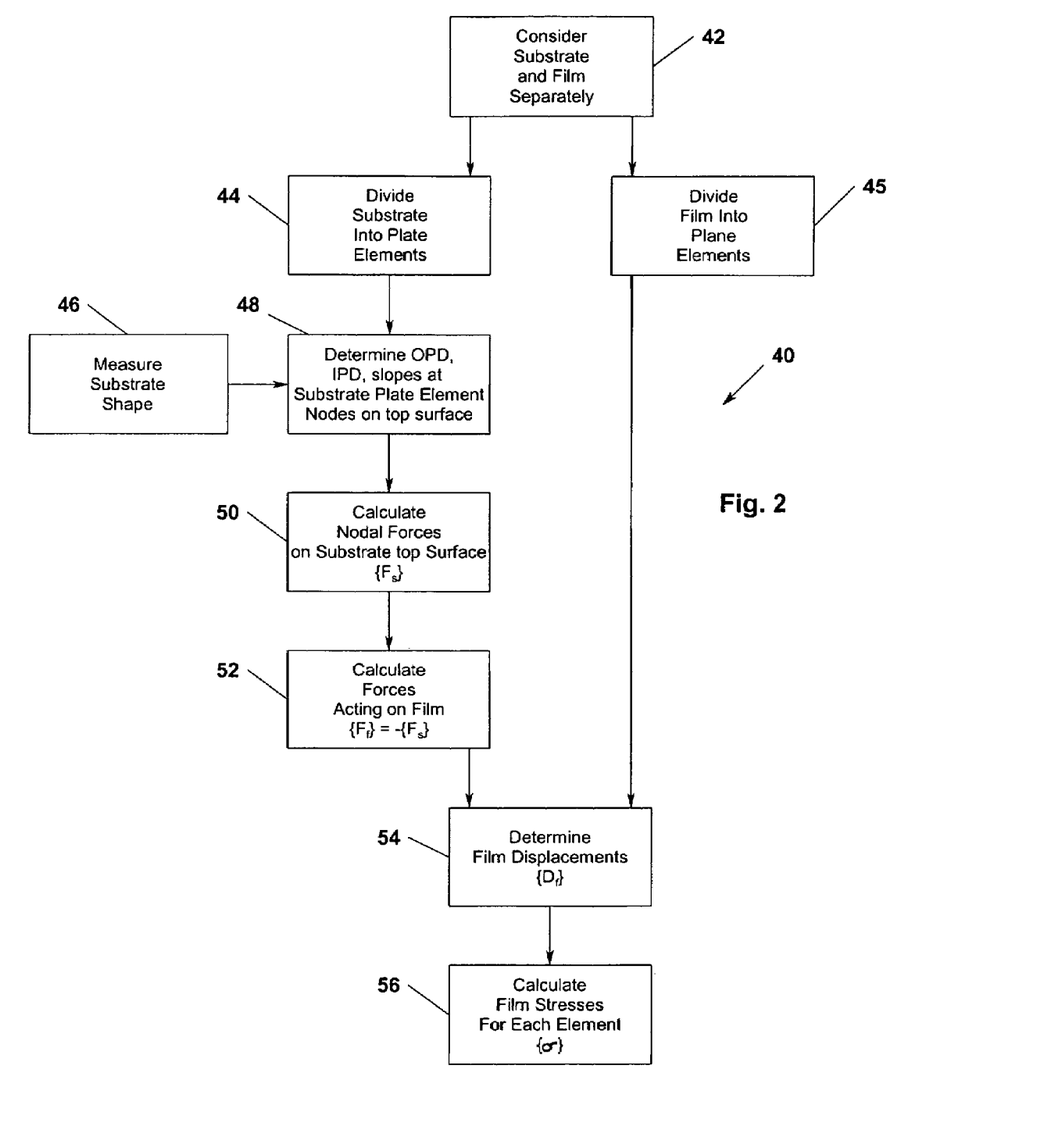
FIG. 2 is a flow chart diagram illustrating an exemplary method for determining film stress from substrate shape using finite element procedures in accordance with the present invention.

An exemplary method 40 in accordance with the present invention for determining film stress from substrate shape using finite element procedures will now be described in detail with reference to the flow chart diagram of FIG. 2. In accordance with the present invention, the film 12 and the substrate 14 to which the film 12 is applied are first considered separately 42. First the substrate 14 is analyzed to obtain the nodal forces at the top surface of the substrate (the surface to which the film 12 is applied). Then the film 12 is analyzed to calculate the film stresses from the nodal forces.

The substrate 14 is divided 44 into plate elements. The plate elements extend from the top surface of the substrate to which the film is applied to the opposite surface of the substrate. The size and shape of the plate elements may be selected based on several factors, including the size and shape of the substrate to be analyzed, the desired accuracy of the resulting film stress determination, etc. If smaller plate elements are used, greater accuracy in the film stress determination may be obtained. Larger plate elements may be used where film stress determination times are of concern. In general, to facilitate the calculations to follow, the plate elements are preferably quad elements, i.e., four sided elements as viewed from the top surface of the substrate 14. For example, the substrate plate elements may be square or rectangular in shape. For a circular wafer substrate the substrate plates may be defined as four-sided shapes defined by radials extending from the center of the substrate wafer to the outer circumference thereof and concentric circles centered on the center of the substrate wafer and spaced between the center of the wafer and the outer circumference thereof.

In a similar manner, the thin film 12 applied to the substrate 14 is divided 45 into plane elements. The film plane elements should conform in size and shape to the substrate plate elements. For each substrate plate element, a node is set at the top surface of the substrate. For each film plane element a corresponding node is set at the interface with the substrate. It should be noted that the present invention is not limited to any particular shape for the substrate plate elements and the film plane elements employed. Other types of elements can also be used.

The substrate shape is measured 46, e.g., using the measuring device 28 as described above. At each substrate plate element node there are six degrees of freedom, i.e., three displacements ($U_x$, $U_y$, and $U_z$) and three rotations ($\theta_x$, $\theta_y$, $\theta_z$). From the measured substrate shape, i.e., the measured out-of-plane displacement (OPD), cross-section rotation, and/or curvature, obtained using the measuring device 28 as described above, all of the displacement and rotation degrees of freedom, i.e., the OPD, in-plane displacement (IPD), and cross-section rotations, at each of the nodes of the substrate 14 may be determined 48 by interpolation using the basic equations of analytical geometry and plate theory. Thus, all nodal displacements, defined by the matrix $\{D_s\}$, of the entire substrate 14 can be determined uniformly from the measured substrate shape. Note that, depending upon the substrate shape measurement device 28 employed, smoothing of the measurement data before the data is used to calculate the nodal displacements may be appropriate to obtain a more accurate result.

Mathematically, the film stress cannot be determined from the measured raw data uniquely, since displacements and curvatures are only collected at a finite number of discrete points on the substrate surface. To eliminate the indeterminacy and evaluate the input data at the defined substrate nodes, which may not coincide with measured data points, an interpolation technique preferably is employed to preprocess the raw data.

Ordinary polynomials (and some special polynomials) can be used as relatively simple interpolation functions. The polynomial order, which directly affects the accuracy in film stress, can be chosen by the following procedure. The measured substrate OPD is represented by an $n^{th}$-order polynomial $W_n(x, y)$, and it is evaluated at substrate nodes $(x_1, y_1)$, $(x_2, y_2)$, ... $(x_i, y_i)$, ... $(x_m, y_m)$. The integer m is the total number of nodes. The order n is a positive integer and varies from zero to infinity. The $W_n(x_1, y_1)$, ... $W_n(x_i, y_i)$ ... and $W_n(x_m, y_m)$ form an m-dimensional vector $\overline{W}_n$:

$$\overline{W}_n = \{W_n(x_1, y_1), \ldots W_n(x_i, y_i) \ldots W_n(x_m, y_m)\} \quad (2)$$

and $\overline{W}_0, \overline{W}_1, \overline{W}_2, \ldots \overline{W}_n, \ldots$ and $\overline{W}_\infty$ form a metric space. The distance (difference) between $\overline{W}_k$ and $\overline{W}_l$ is normalized and the result is denoted as:

$$\Delta(\overline{W}_k, \overline{W}_l) = \frac{\sqrt{\sum_{i=l}^{m}[\overline{W}_k(x_i, y_i) - \overline{W}_l(x_i, y_i)]^2}}{\sqrt{\sum_{i=l}^{m}\overline{W}_l(x_i, y_i)^2}}. \quad (3)$$

When a tolerance of the normalized distance is specified (denoted as $\eta$), a polynomial order $N_0$ is selected as an initial guess, and the normalized distance between $\overline{W}_{No-1}$ and $\overline{W}_{No}$ is calculated by Eq. (3) to determine whether the inequality of Eq. (4) is satisfied:

$$\Delta(\overline{W}_{No-1}, \overline{W}_{No}) < \eta. \quad (4)$$

If it is not satisfied, $N_0$ has to be increased and the inequality of Eq. (4) should be checked again. These steps are repeatedly performed until the inequality is satisfied and the necessary polynomial order is identified.

The nodal forces, defined by the matrix $\{F_s\}$, on the top of the substrate 14 are calculated 50 by matrix multiplication:

$$\{F_s\} = [K_s]\{D_s\} \quad (5)$$

where, $\{F_s\}$=nodal forces at the top surface of the substrate, six components at each node;
$[K_s]$=stiffness matrix of the substrate;
$\{D_s\}$=displacements of the substrate, six components at each node.

The stiffness matrix $[K_s]$ of the substrate includes known values based on the material and geometric characteristics of the substrate 14 under investigation.

Since the nodal forces $\{F_s\}$, as determined from Equation (5), are at the top of the substrate 14, the corresponding nodal forces on the film 12, as denoted by the matrix $\{F_f\}$, may be calculated 52 as:

$$\{F_f\} = -\{F_s\}. \quad (6)$$

The film displacements, at the film plane element nodes, defined by the matrix $\{D_f\}$, are then determined 54 by solving:

$$[K_f]\{D_f\} = \{F_f\} \quad (7)$$

where, $[K_f]$=film stiffness matrix;
$\{D_f\}$=displacements of the film.

The film stiffness matrix $[K_f]$ includes known values determined based on the material and geometric characteristics of the film 12.

Film stresses, defined by the matrix $\{\sigma\}$, are then calculated 56 element-by-element as follows:

$$\{\sigma\} = [E][b]\{d\} \quad (8)$$

where, $[E]$=elastic matrix (film);
  $[b]$=strain-displacement matrix (film);
  $\{d\}$=displacement matrix of an element (film). The film elastic matrix $[E]$ contains known values based on the physical characteristics of the film.

Note that the computations presented in Equations 5, 7 and 8 are normal displacement-based finite element analyses that could be performed using many commercial finite element analysis software products, such as the finite element calculations available in the ANSYS® engineering simulation software product mentioned above. Alternatively, specialized finite element computer program functions may be written to perform the desired calculations.

An exemplary application of the method for determining film stress from substrate shape using finite element procedures as described above will now be described in detail.

A method for determining film stress from substrate shape using finite element procedures in accordance with the present invention was utilized to process experimental substrate deformation data measured by various tools. For exemplary purposes, the results of a method for determining film stress in accordance with the present invention as used to determine the film stress in a typical EUV reticle with a thin multilayer film on a substrate will be described. The material properties and geometry of the reticle as used in the experiment are given in Table I.

TABLE I

Material and geometric characteristics of the measured EUV reticle.

| Parameter | Elastic modulus E(GPa) | Poisson's Ratio v | Thickness t(mm) | Side length a(mm) |
|---|---|---|---|---|
| Substrate | 69.3 | 0.17 | 6.35 | 152.4 |
| Multilayer | 180 | 0.29 | $2.8 \times 10^{-4}$ | 152.4 |

The out-of-plane displacement caused by intrinsic film stress was measured by an interferometer. The measured contours were not axisymetric. A detailed investigation showed that the two principal curvature radii were neither constant over the whole substrate nor equal to each other at most points, i.e., the reticle shape was not spherical. Thus, Stoney's equation would not produce meaningful stress results and a method of determining film stress from substrate shape using finite element procedures in accordance with the present invention was used to determine the stress in the multilayer thin film reflector.

The calculated values of normal stresses in the x and y directions, $\sigma_x$ and $\sigma_y$, respectively, were not equal to each other at most points, and the distribution of both was not uniform. The $\sigma_x$ magnitudes varied from −346 to −645 MPa, and $\sigma_y$ ranged from −404 to −824 MPa. The maximum value was about twice the minimum value. If the two principal stresses were equal to each other, the shearing stress in the film would be zero. The actual shearing stress varied from −172 to +205 MPa. Stoney's equation cannot provide correct stress magnitudes or stress distributions for such a case.

Based on these stress components, parameters for stress control, such as principal stresses, Von Mises stress, average normal stress, and shearing stress of particular planes can be calculated. These parameters influence the film mechanical distortions and dislocation generation, and thus adversely affect the film quality and thus the characteristics of subsequent devices fabricated from such film-substrate combinations.

Average stress $\sigma_a$ can be calculated as follows:

$$\sigma_a = (\sigma_x + \sigma_y)/2 \qquad (9)$$

The average stress was selected as a stress control parameter. The target value was 480 MPa compressive and uniform. In most areas the average stress was lower than the targeted values, and exceeded the target value only in the small neighborhoods of the corners of the film.

Figure 3:
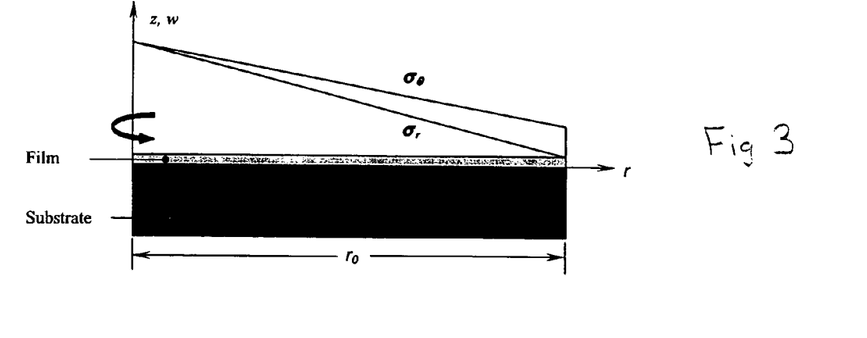
FIG. 3 is a schematic illustration of the film stresses in a film-substrate test case in which the film radial stress and circumferential stress vary linearly from a maximum value at the center of the film to a minimum at the outer edge.

Numerical tests can be utilized to assess the accuracy of techniques used to determine film stress from substrate deformation. A test case that was chosen is a special axisymetric example in which the film radial stress and circumferential stress vary linearly from a maximum value at the center to a minimum at the outer edge of a circular wafer substrate. See FIG. 3. An exact solution for this case has been developed. The radial stress $\sigma_r$ and circumferential stress $\sigma_\theta$ are given by:

$$\sigma_r = \sigma_c(1 - r/r_0) \qquad (10)$$

$$\sigma_\theta = \sigma_c[1 - (1+2v_f)r/(2+v_f)r_0] \qquad (11)$$

where $\sigma_c$ is the maximum stress at the center of the film, r is the radial coordinate, $r_o$ is the outer radius and $v_f$ is Poisson's ratio of the film.

The radial stress and the circumferential stress have the same maximum value at the center. At the outer edge, the radial stress decreases to zero, but the circumferential stress is not equal to zero. The corresponding out-of-plane displacement (OPD) of the substrate is given by:

$$w = \frac{3\sigma_c r_0^2 t_f (1 - v_s^2)}{E_s t_s^2 (2 + v_f)} \left[ \frac{(2 + v_s)}{(1 + v_s)} \left(\frac{r}{r_0}\right)^2 - \frac{2}{3}\left(\frac{r}{r_0}\right)^3 \right] \qquad (12)$$

where $t_s$ and $t_f$ are the substrate and film thicknesses, respectively, $E_s$ is the elastic modulus of the substrate, and $v_s$ is Poisson's ratio of the substrate. The analytical solution is based on elasticity theory and satisfies equilibrium, compatibility and boundary conditions. Thus, it can be used as a benchmark for the accuracy of determining film stress using prior art methods that employ Stoney's equation and using a procedure for determining film stress from substrate shape using finite element procedures in accordance with the present invention. The material and geometric parameters for the exemplary test case are listed in Table II:

TABLE II

Material and geometric characteristics for the numerical test case.

| Parameter | Elastic modulus E(GPa) | Poisson's Ratio v | Thickness t(μm) | Outer radius $r_0$(mm) |
|---|---|---|---|---|
| Substrate (Si) | 160 | 0.12 | 625 | 50 |
| Film (Cr) | 248 | 0.30 | 0.10 | 50 |

The radial stress, $\sigma_r$, has its maximum value of 500 MPa at the center and decreases linearly to zero at the outer edge. The circumferential film stress, $\sigma_\theta$, was not equal to $\theta_r$ except at the center, but it also decreased linearly from the center to the outer edge. The minimum value of $\sigma_\theta$ was 150 MPa at the outer edge.

Figure 4:
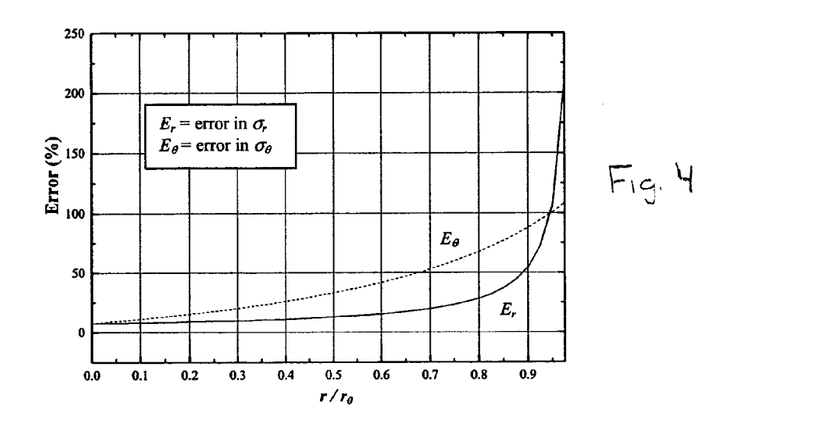
FIG. 4 is a graph illustrating the errors between the film stresses determined using a conventional indirect method employing Stoney's equation and the exact solution for the test case illustrated in FIG. 3.

Equation 1, Stoney's equation, was locally applied to this test case. The curvature at each point was calculated from the out-of-plane displacement data. The film stresses were calculated point-by-point, and compared with the exact numerical solution. The errors caused by locally applying Stoney's equation in this case are illustrated in FIG. 4. When the radial coordinate, r, varied from 0 to 97.5% of the outer radius, the error in $\sigma_r$ ranged from 7.8% to 211%, and the error in $\sigma_\theta$ from 7.8% to 109%. As shown by the numerical test case, the error induced by Stoney's equation is unacceptable for stress determination and control.

Figure 5:
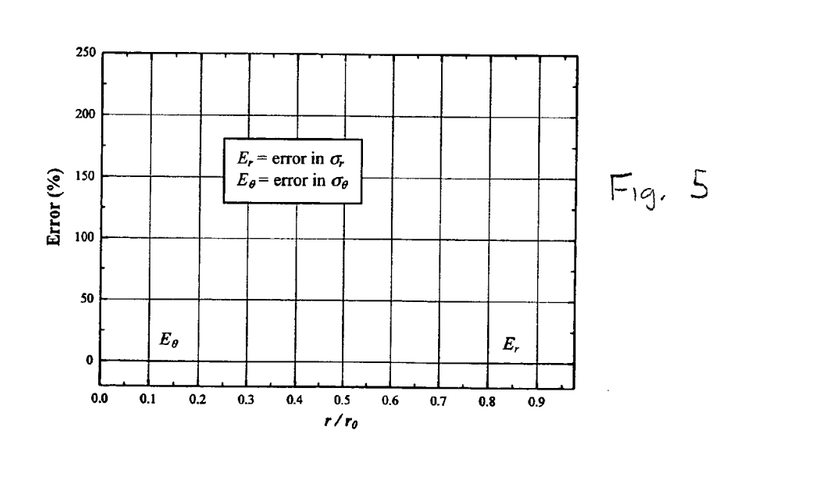
FIG. 5 is a graph illustrating the errors between the film stresses determined using a method for determining film stresses in accordance with the present invention and the exact solution for the test case illustrated in FIG. 3.

The numerical test case being discussed was utilized again to evaluate the accuracy of the film stress obtained from substrate shape using finite element procedures in accordance with the present invention. The out-of-plane distortion values for the test case were directly input into a program for determining film stress from substrate shape using finite element procedures in accordance with the present invention. The errors generated by the resulting film stress determined in accordance with the present invention are shown in FIG. 5. When r is varied from 0 to 97.5% of the outer radius, the error in $\sigma_r$ ranged from 0.01% to 0.53%, and the error in $\sigma_\theta$ ranged from 0.08% to 0.51%. These errors are negligible. Comparing FIG. 4 to FIG. 5 obviously demonstrates that the technique for determining film stress from substrate shape using finite element procedures in accordance with the present invention is superior to the local application of Stoney's equation as used in current systems and methods for determining film stress.

It should be understood that the present invention is not limited to the particular embodiments, examples, and applications illustrated and described herein, but embraces all such modified forms thereof as come within the scope of the following claims. In particular, it should be noted that a method for determining film stress from substrate shape in accordance with the present invention may be used to accurately determine in-plane stresses in films applied to substrates, as described in the examples above, as well as to determine out-of-plane stresses (in the thickness) in the film.

What is claimed is:

1. A method for determining stress in a film applied to a top surface of a substrate, comprising:
   (a) measuring a displacement of a shape of the substrate;
   (b) determining forces at the top surface of the substrate from the measured displacement of the shape of the substrate;
   (c) determining forces acting on the film from the determined forces at the top surface of the substrate;
   (d) determining film displacements from the determined forces acting on the film and stiffness of the film; and
   (e) determining the film stress from the determined film displacements.

2. The method of claim 1 wherein measuring the displacement of the shape of the substrate includes measuring at least one of an out-of-plane displacement, cross-section rotation, or curvature of the substrate at a plurality of points on the substrate and determining the shape of the substrate from the at least one measured out-of-plane displacement, cross-section rotation, or curvature.

3. The method of claim 1 wherein determining forces at the top surface of the substrate includes determining forces at the top surface of the substrate from the measured displacement of the shape of the substrate and a stiffness of the substrate.

4. The method of claim 1 wherein determining forces acting on the film includes determining forces acting on the film as the negative of the forces at the top surface of the substrate.

5. The method of claim 1 wherein the film is applied to the top surface of an elastic substrate.

6. The method of claim 1 wherein determining the film stress includes determining in-plane film stress.

7. The method of claim 1 comprising additionally providing the determined film stress to a process controller.

8. A method for determining stress in a film applied to a top surface of a substrate, comprising:
   (a) dividing the substrate into substrate plate elements having plate element nodes set at the top surface of the substrate;
   (b) dividing the film into film plane elements having plane element nodes set at an interface with the substrate plate element nodes;
   (c) determining displacements of the substrate plate element nodes, denoted by a displacement matrix $\{D_s\}$;
   (d) determining forces at the substrate plate element nodes, denoted by a matrix $\{F_s\}$, from the displacement matrix $\{D_s\}$ and a substrate stiffness matrix $[K_s]$;
   (e) determining forces acting on the film at the film plane element nodes, denoted by the matrix $\{F_f\}$, from the determined forces at the substrate plate element nodes $\{F_s\}$ as $\{F_f\}=-\{F_s\}$;
   (f) determining film displacements of the film plane element nodes, denoted by the matrix $\{D_f\}$, from the determined forces acting on the film at the film plane element nodes $\{F_f\}$ and a film stiffness matrix $[K_f]$; and
   (g) determining the film stress for the film plane elements from the determined film displacements.

9. The method of claim 8 wherein determining displacements of the substrate plate element nodes includes measuring at least one of an out-of-plane displacement, cross-section rotation, or curvature of the substrate at a plurality of points thereon and determining displacements for the substrate plate element nodes from the at least one measured out-of-plane displacement, cross-section rotation, or curvature.

10. The method of claim 8 wherein determining displacements for the substrate plate element nodes includes determining displacements and rotations for the substrate plate elements for six degrees of freedom for each substrate plate element node.

11. The method of claim 8 wherein the substrate plate elements and the film plane elements are four sided elements.

12. The method of claim 8 wherein determining the film stress for the film plane elements includes calculating the film stresses on an element-by-element basis from the determined film displacements, an elastic matrix, and a strain-displacement matrix of each element.

13. The method of claim 8 wherein the film is applied to the top surface of an elastic substrate.

14. The method of claim 8 comprising additionally providing the determined film stress to a process controller.

15. A system for determining stress in a film applied to a top surface of a substrate, comprising:
   (a) a measuring device adapted to measure at least one of an out-of-plane displacement, cross-section rotation, or curvature of the substrate at a plurality of points on the substrate;
   (b) a computer coupled to the measuring device and adapted to receive measurements therefrom and programmed to:
      (i) determine a displacement of a shape of the substrate from the at least one measured out-of-plane displacement, cross-section rotation, or curvature;
      (ii) determine forces at the top surface of the substrate from the determined displacement of the shape of the substrate;
      (iii) determine forces acting on the film from the determined forces at the top surface of the substrate;
      (iv) determine film displacements from the determined forces acting on the film and a stiffness of the film; and (v) determine the film stress from the determined film displacements.

16. The system of claim 15 wherein the computer is programmed to determine forces at the top surface of the substrate from the determined displacement of the shape of the substrate and a stiffness of the substrate.

17. The system of claim 15 wherein the computer is programmed to determine forces acting on the film as the negative of the forces at the top surface of the substrate.

18. The system of claim 15 wherein the measuring device employs a measurement technique selected from the group of measurement techniques consisting of interferometry, profilometry, and laser scanning.

19. The system of claim 15 wherein the computer is programmed to determine the film stress including determining in-plane film stress.

* * * * *